United States Patent
Gouko et al.

(10) Patent No.: US 10,859,447 B2
(45) Date of Patent: Dec. 8, 2020

(54) OPERATING-STATUS DIAGNOSTIC APPARATUS

(71) Applicant: DENSO CORPORATION, Kariya (JP)

(72) Inventors: Norio Gouko, Kariya (JP); Atusi Sakaida, Kariya (JP); Toshihisa Taniguchi, Kariya (JP); Keiji Okamoto, Kariya (JP); Yoshihiko Shiraishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 15/775,744

(22) PCT Filed: Nov. 9, 2016

(86) PCT No.: PCT/JP2016/083248
§ 371 (c)(1),
(2) Date: May 11, 2018

(87) PCT Pub. No.: WO2017/082302
PCT Pub. Date: May 18, 2017

(65) Prior Publication Data
US 2018/0274994 A1  Sep. 27, 2018

(30) Foreign Application Priority Data
Nov. 12, 2015 (JP) ................. 2015-222445

(51) Int. Cl.
*G01M 13/02* (2019.01)
*G01K 17/20* (2006.01)
(52) U.S. Cl.
CPC ............. *G01K 17/20* (2013.01); *G01M 13/02* (2013.01)

(58) Field of Classification Search
CPC ........ G01N 25/18; G01N 30/66; G01N 25/00; G01K 17/00; G01K 17/06; G01K 13/00;
(Continued)

(56) References Cited

U.S. PATENT DOCUMENTS 4,274,475 A * 6/1981 Rall ...................... G05D 23/19
165/211
4,577,976 A * 3/1986 Hayashi ................. G01N 25/18
374/29
(Continued)

FOREIGN PATENT DOCUMENTS

DE  102006016956 A1  10/2007
JP  S6156759 A  3/1986
(Continued)

OTHER PUBLICATIONS

International Search Report dated Feb. 7, 2017 in corresponding PCT Application No. PCT/JP2016/083248.

*Primary Examiner* — Gail Kaplan Verbitsky
(74) *Attorney, Agent, or Firm* — Harness, Dickey & Pierce, P.L.C.

(57) ABSTRACT

An operating-status diagnostic apparatus includes a sensor unit and a control unit. The sensor unit detects heat fluxes flowing outward from a component of a facility. A control unit determines whether or not an operating status of the facility indicates that the component is in a warming-up complete state where warming-up of the component is completed based on a detection result of detection by the sensor unit.

6 Claims, 9 Drawing Sheets

Figure 1:
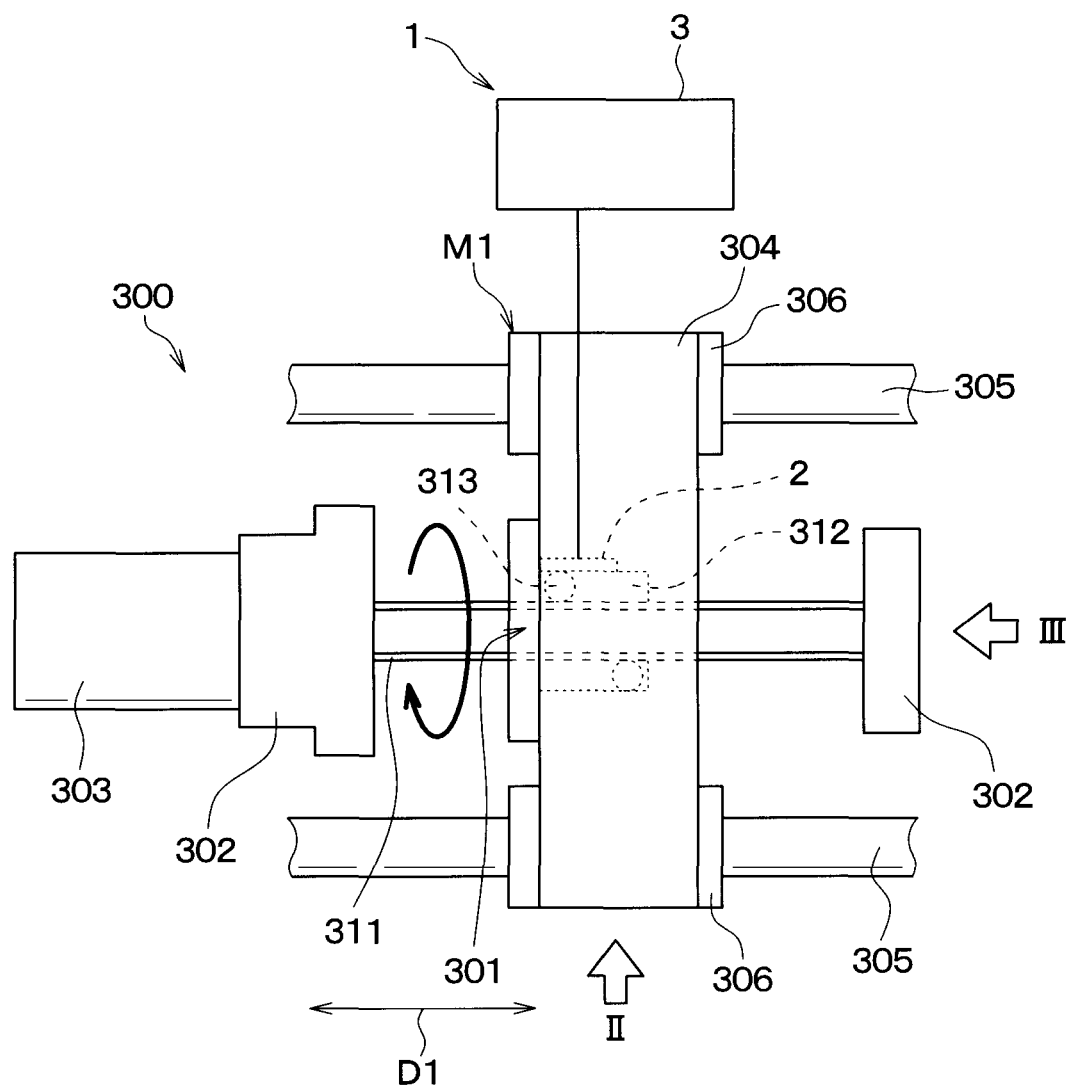

(58) Field of Classification Search
CPC .......... G01K 17/20; G01K 3/08; G01K 17/08; G01K 7/20; G01M 13/02
USPC .............. 340/500; 700/299, 300; 702/35, 40
See application file for complete search history.

(56) References Cited

U.S. PATENT DOCUMENTS

| | | | |
|---|---|---|---|
| 4,779,994 A | 10/1988 | Diller et al. | |
| 4,784,212 A * | 11/1988 | Brimer | G05D 23/1917 165/240 |
| 5,741,068 A * | 4/1998 | Hemmerich | G01K 17/00 374/31 |
| 6,392,431 B1 * | 5/2002 | Jones | G01K 1/026 324/750.09 |
| 10,408,690 B2 * | 9/2019 | Gouko | G01K 17/00 |
| 10,464,113 B2 * | 11/2019 | Gouko | B21C 51/00 |
| 2003/0043882 A1 * | 3/2003 | Burger | H05K 13/082 374/141 |
| 2013/0083821 A1 * | 4/2013 | Schwank | G01K 17/06 374/29 |
| 2015/0308906 A1 * | 10/2015 | Durrer | G01K 17/20 374/29 |
| 2015/0323395 A1 * | 11/2015 | Kawakami | F16H 59/72 702/130 |
| 2016/0125671 A1 | 5/2016 | Tanaka et al. | |
| 2016/0129817 A1 * | 5/2016 | Shimizu | B60N 2/5685 219/202 |
| 2016/0141733 A1 | 5/2016 | Shiraishi et al. | |
| 2017/0211990 A1 | 7/2017 | Gouko et al. | |
| 2018/0313725 A1 * | 11/2018 | Harada | G01M 5/0033 |

FOREIGN PATENT DOCUMENTS

| | | | |
|---|---|---|---|
| JP | H05301144 A | | 11/1993 |
| JP | 5376086 B1 | | 12/2013 |
| JP | 2017090318 A | | 5/2017 |
| JP | 02017090320 A | * | 5/2017 |
| JP | 2017090320 A | | 5/2017 |
| WO | WO-2014196290 A1 | | 12/2014 |
| WO | WO-2014196294 A1 | | 12/2014 |

* cited by examiner

OPERATING-STATUS DIAGNOSTIC APPARATUS

CROSS REFERENCE TO RELATED APPLICATIONS

This application is a U.S. National Phase Application under 35 U.S.C. 371 of International Application No. PCT/JP2016/083248 filed on Nov. 9, 2016 and published in Japanese as WO 2017/082302 A1 on May 18, 2017. This application is based on and claims the benefit of priority from Japanese Patent Application No. 2015-222445 filed on Nov. 12, 2015. The entire disclosures of all of the above applications are incorporated herein by reference.

FIELD

The present disclosure relates to an operating-status diagnostic apparatus which diagnoses an operating status of a facility.

BACKGROUND

A heat flux sensor which detects heat fluxes is disclosed in, for example, PTL 1. Patent Literature
PTL 1 Japanese Patent No. 5376086

SUMMARY

In facilities such as production facilities, a warming-up operation for raising the temperature of the facility is performed from immediately after the start of operation until the facility is stabilized. When the warming-up is completed, the operating status of the facility is switched from the warming-up operation to a steady-state operation. The steady-state operation is operation of the facility in the stabilized state. In other words, the steady-state operation is operation in a state where the facility can fully deliver its inherent performance.

However, a long warming-up operation delays the start of steady-state operation. Thus, warming-up operation is desirably switched to steady-state operation immediately when the warming-up is completed. To achieve this, it is necessary to be able to appropriately determine whether or not the facility is in a warming-up complete state where the warming-up has completed.

An object of the present disclosure is to provide an operating-status diagnostic apparatus which can appropriately determine whether or not the facility is in the warming-up complete state.

A first aspect according to an operating-status diagnostic apparatus is an operating-status diagnostic apparatus diagnosing an operating status of a facility, the apparatus including a sensor unit detecting heat fluxes flowing outward from a component of the facility and a control unit determining whether or not the operating status of the facility indicates that the component is in a warming-up complete state where warming-up of the component is completed, based on a detection result of detection by the sensor unit.

A change tendency of heat fluxes varies between a warming-up period and a period in a warming-up complete state. Thus, the diagnostic apparatus of the present disclosure can determine whether or not the component is in the warming-up complete state.

DRAWINGS

Figure 2:
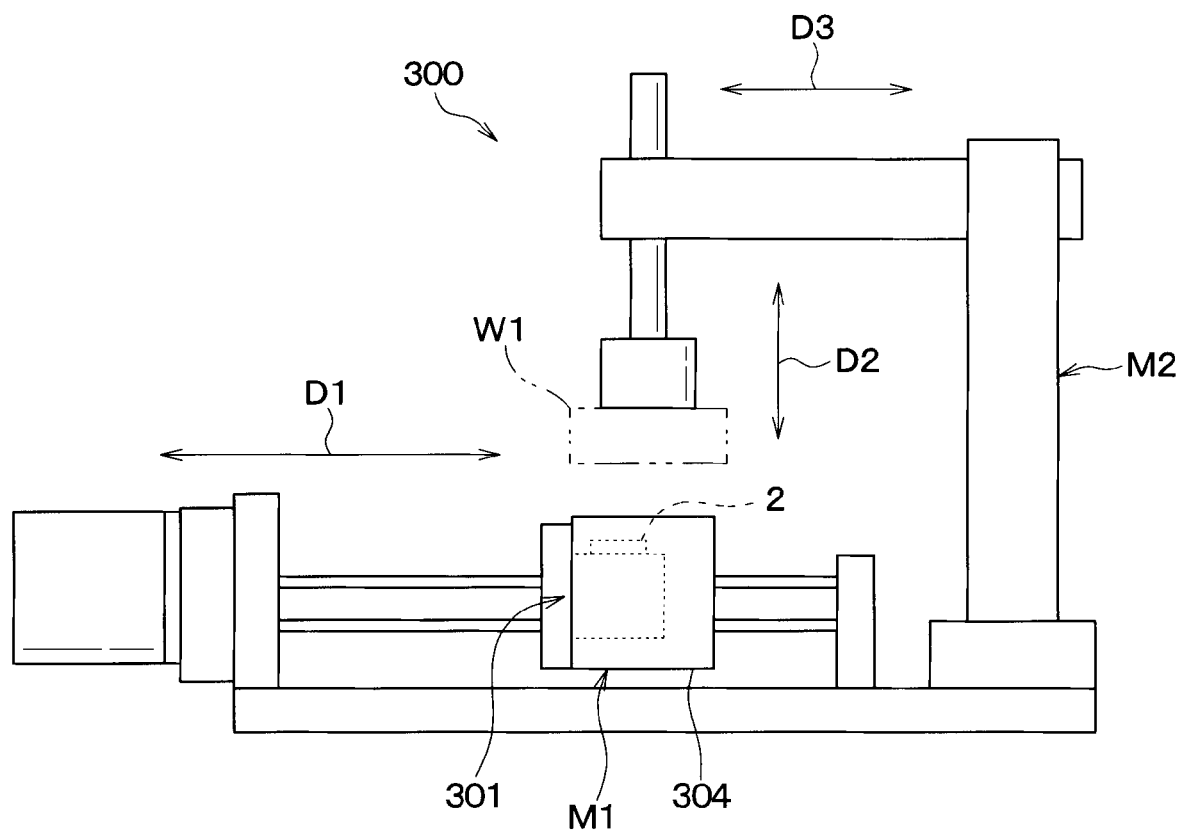
Figure 3:
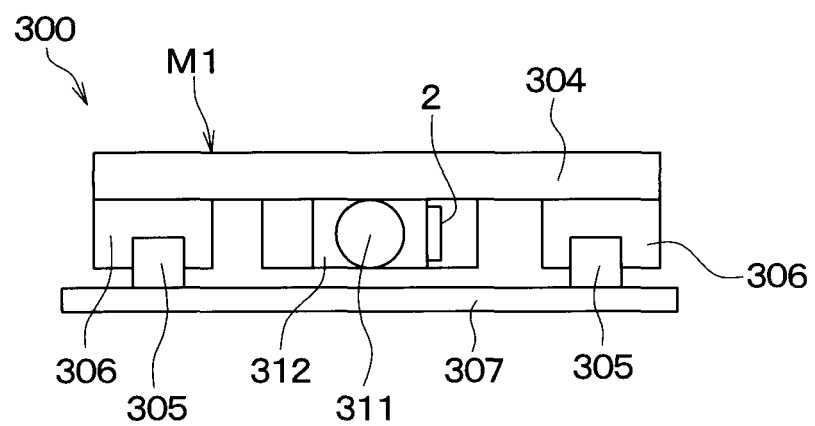
Figure 4:
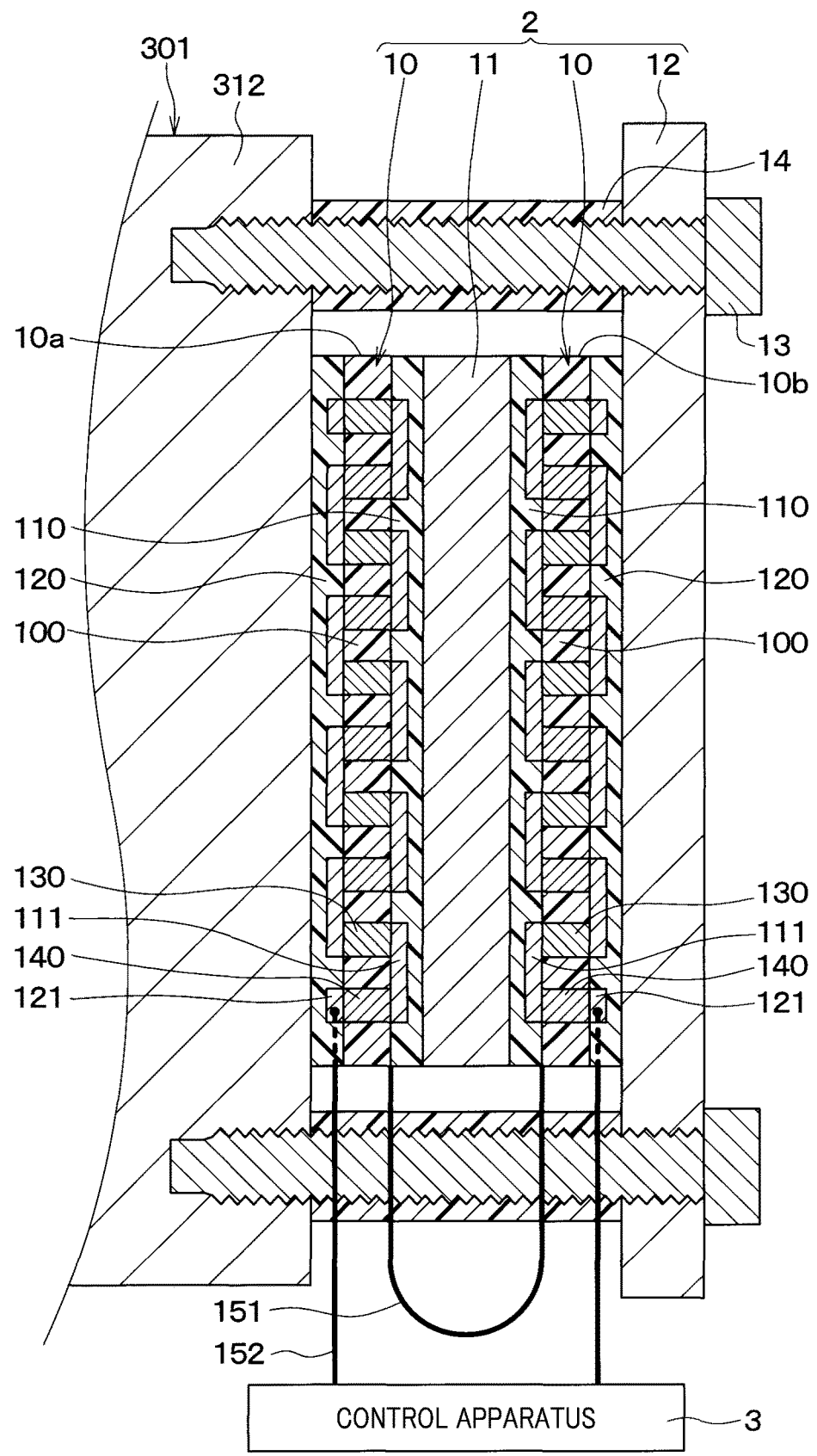
Figure 5:
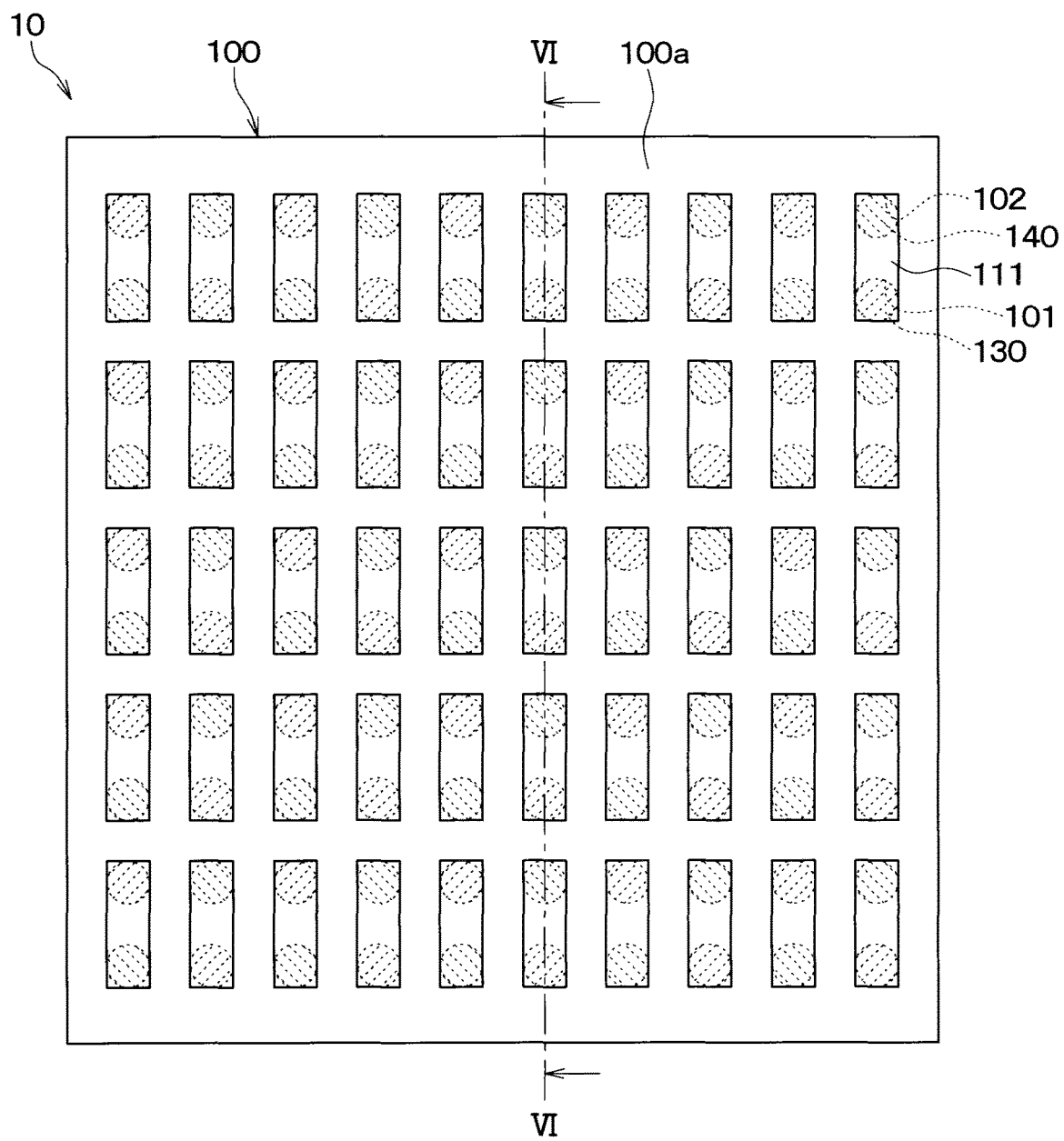
Figure 6:
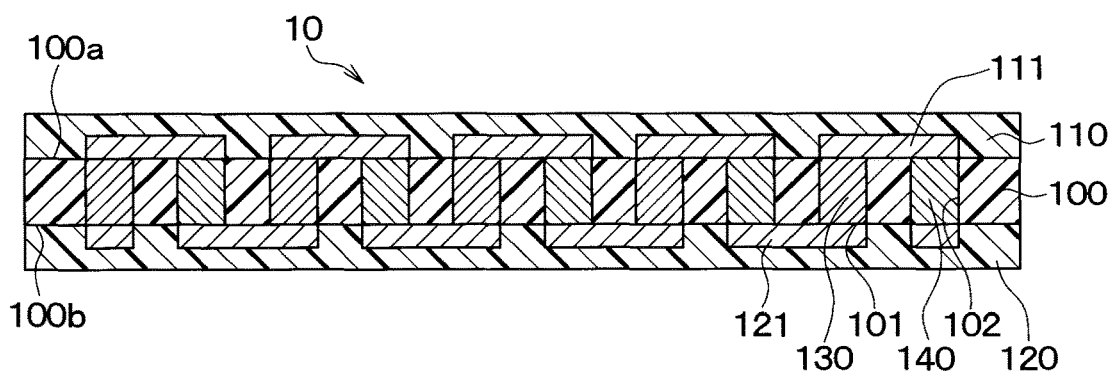
Figure 7:
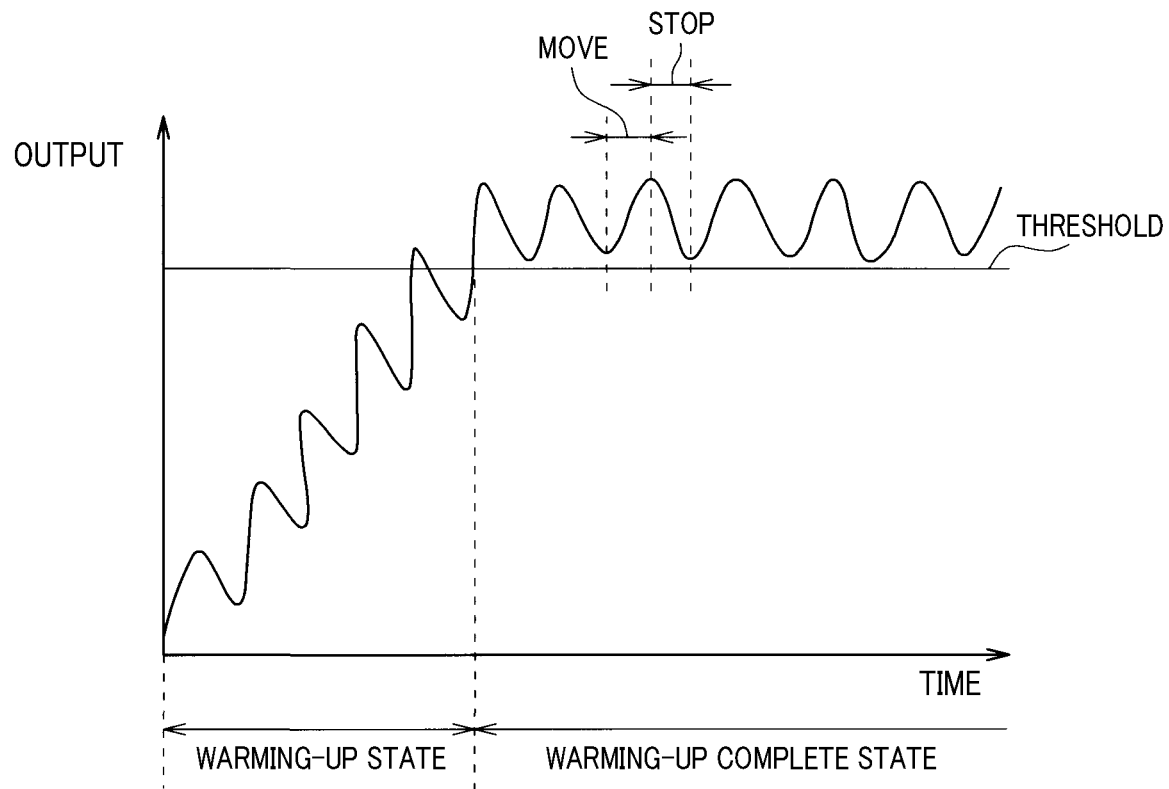
Figure 8:
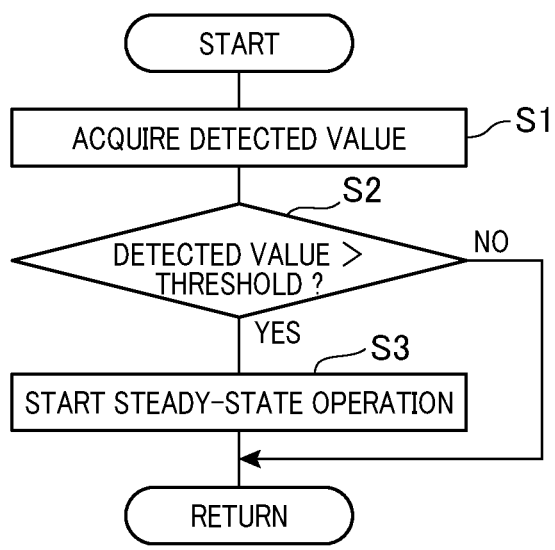
Figure 9:
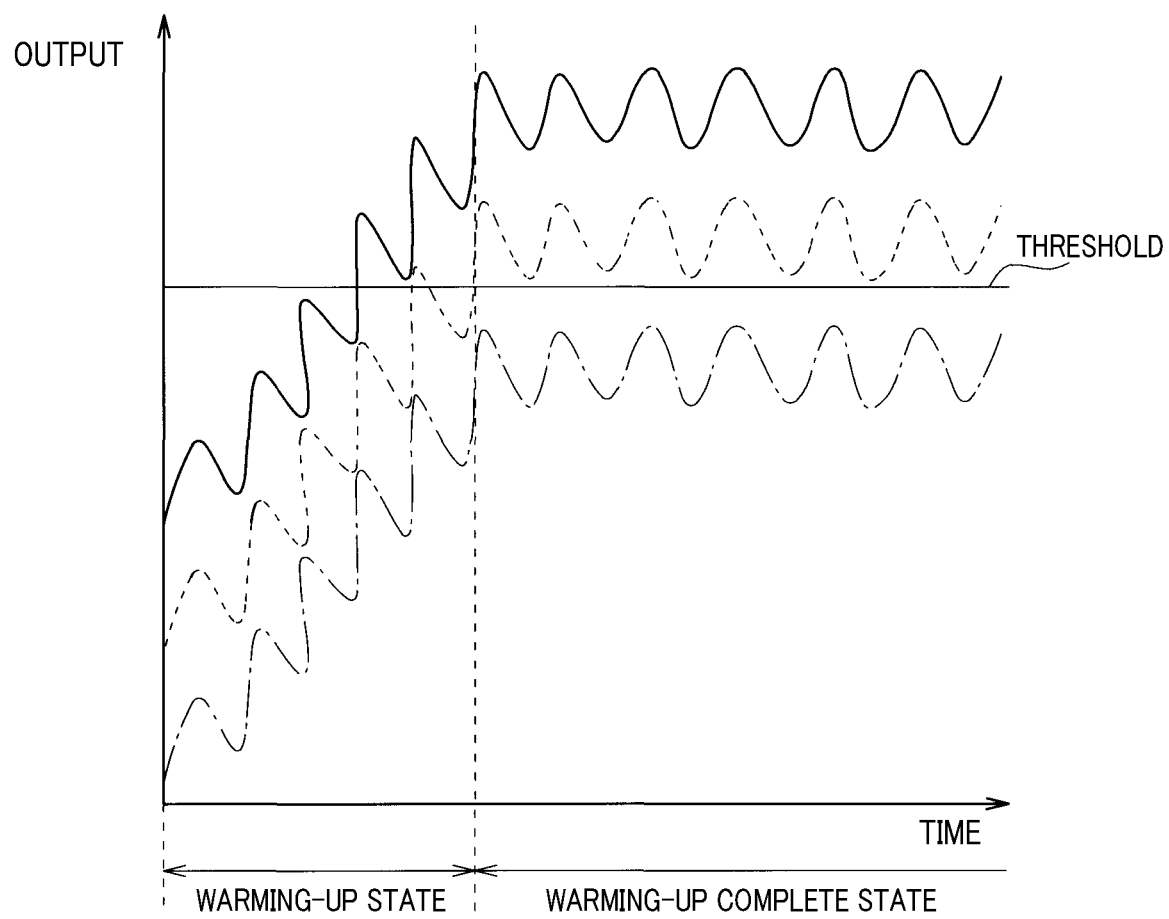
Figure 10:
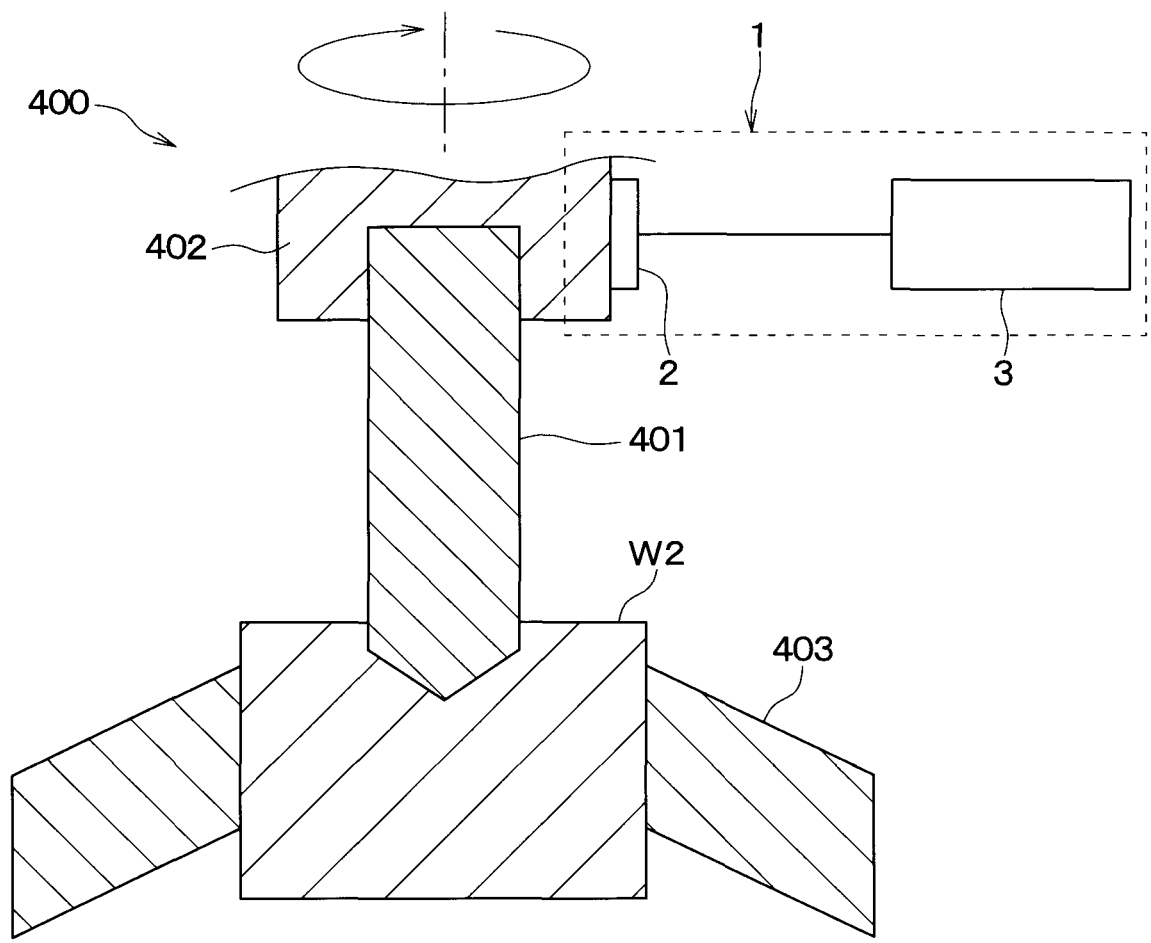
Figure 11:
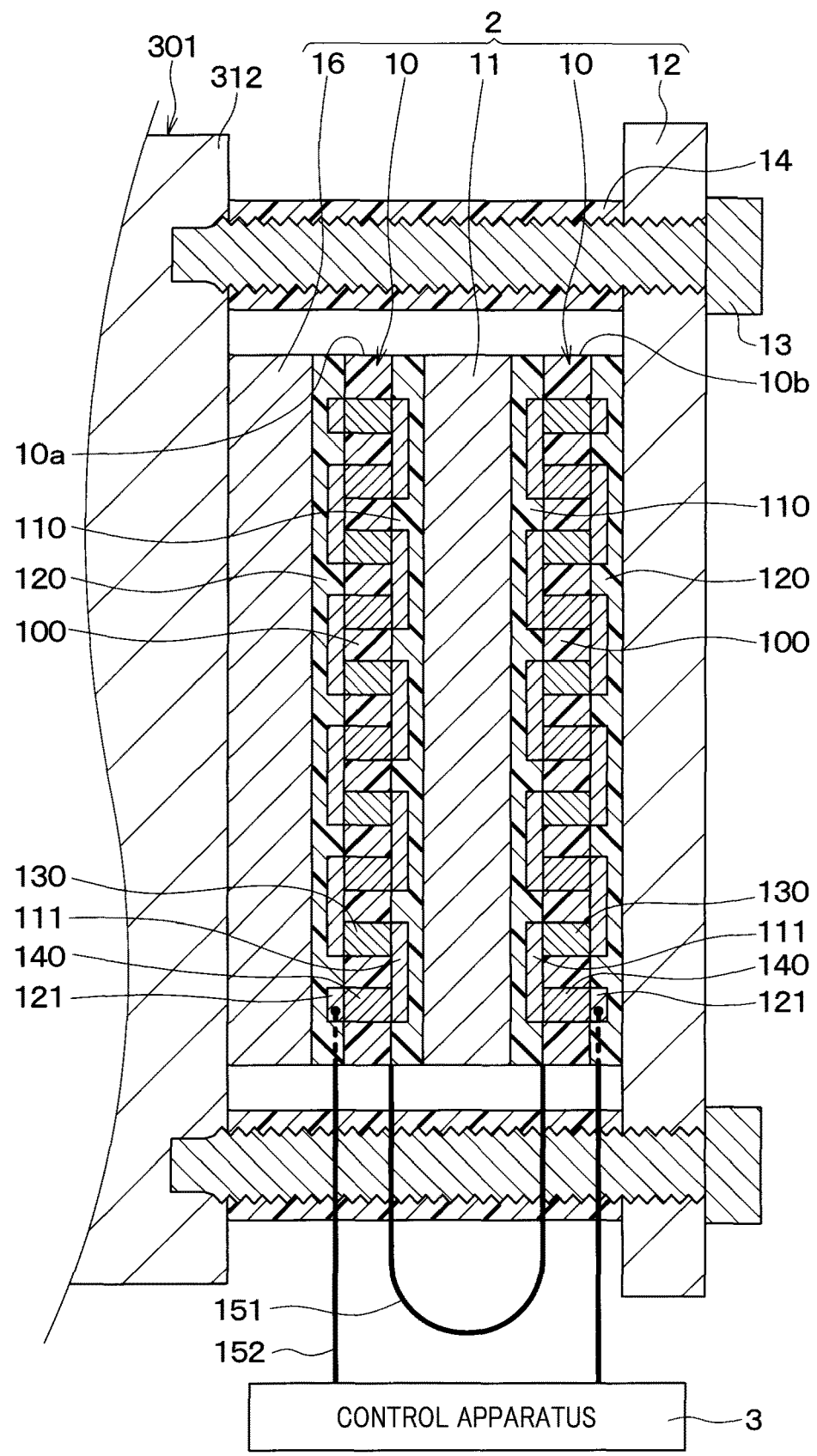
Figure 12:
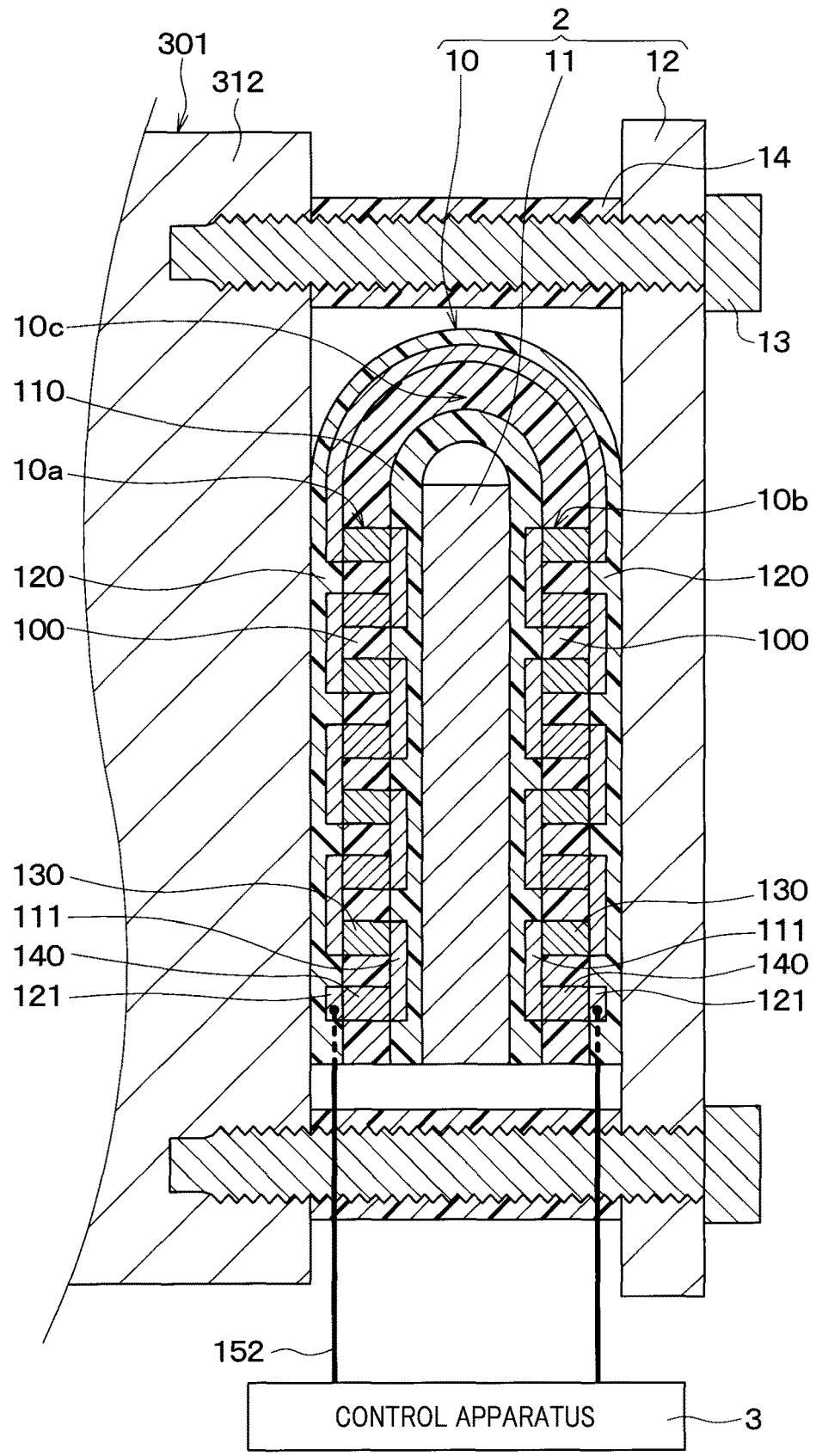

The attached drawings are as described below.
FIG. 1 is a diagram illustrating a configuration of a workpiece feeding apparatus and an operating-status diagnostic apparatus according to a first embodiment;
FIG. 2 is a diagram of the workpiece feeding apparatus viewed in a direction of an arrow II illustrated in FIG. 1;
FIG. 3 is a diagram of the workpiece feeding apparatus viewed in a direction of an arrow III illustrated in FIG. 1;
FIG. 4 is a cross-sectional view of a sensor unit illustrated in FIG. 1;
FIG. 5 is a plan view of a heat flux sensor illustrated in FIG. 4;
FIG. 6 is a cross-sectional view of the heat flux sensor taken along a line VI-VI illustrated in FIG. 5;
FIG. 7 is a diagram illustrating output waveforms of the sensor unit during a period in a warming-up state and during a period in a warming-up complete state;
FIG. 8 is a flowchart illustrating operation control for the workpiece feeding apparatus according to the first embodiment;
FIG. 9 is a diagram illustrating output waveforms of a heat flux sensor during a period when an environmental temperature is high and during a period when the environmental temperature is low, in a variation of the first embodiment in which one heat flux sensor is used;
FIG. 10 is a diagram illustrating a configuration of an automatic cutting machine and an operating-status diagnostic apparatus according to a second embodiment;
FIG. 11 is a cross-sectional view of a sensor unit according to a third embodiment; and
FIG. 12 is a cross-sectional view of a sensor unit according to a fourth embodiment.

DESCRIPTION

Embodiments of the present disclosure will be described below based on the figures. In descriptions of the embodiments, the same or equivalent components are designated by the same reference numerals.

First Embodiment

As illustrated in FIG. 1, FIG. 2, and FIG. 3, an operating-status diagnostic apparatus 1 according to the present embodiment diagnoses a warming-up complete status of a workpiece feeding apparatus 300. The workpiece feeding apparatus 300 is installed in a production facility where a workpiece W1, which corresponds to a machining object, is machined.

As illustrated in FIG. 2, the workpiece feeding apparatus 300 includes a linear movement mechanism M1 with a ball screw 301, and a robot M2. The workpiece feeding apparatus 300 transfers the workpiece W1 using the linear movement mechanism M1 and the robot M2. The linear movement mechanism M1 transfers the workpiece W1 in a direction D1. The robot M2 transfers the workpiece W1 in a direction D2, a direction D3, and the like.

The robot M2 transfers the workpiece W1 to a pedestal 304 of the linear movement mechanism M1. The robot M2 mounts the workpiece W1 on the pedestal 304. The linear movement mechanism M1 transfers the mounted workpiece W1.

As illustrated in FIG. 1 and FIG. 3, the linear movement mechanism M1 includes a ball screw 301, support members 302, a motor 303, the pedestal 304, rails 305, and guide blocks 306. In FIG. 3, the support members 302 are omitted for easier understanding.

The ball screw 301 is a component of the workpiece feeding apparatus 300. The ball screw 301 is a mechanical component which converts a rotary motion into a linear motion. The ball screw 301 has a screw shaft 311, a nut 312, and balls 313. Balls 313 are arranged between the screw shaft 311 and the nut 312. Rotation of the screw shaft 311 allows the nut 312 to move linearly. Each of the support members 302 supports a corresponding one of axially opposite ends of the screw shaft 311. The motor 303 is a power source which rotates the screw shaft 311.

The pedestal 304 is a component on which the workpiece W1 is mounted. The pedestal 304 appears, in plan view, as a rectangle having a longitudinal direction orthogonal to the axial direction of the screw shaft 311 (that is, an up-down direction in FIG. 1). A longitudinally approximately central portion of the pedestal 304 is coupled to the nut 312. Longitudinally opposite ends of the pedestal 304 are coupled to the respective guide blocks 306.

The rails 305 are linear members. The two rails 305 are used and fixed to a base plate 307 as illustrated in FIG. 3. The guide blocks 306 are engaged with the respective rails. The guide blocks 306 serve as guide members which move along the respective rails 305.

As illustrated in FIG. 1, the diagnostic apparatus 1 includes a sensor unit 2 and a control apparatus 3.

The sensor unit 2 detects heat fluxes flowing outward from the ball screw 301. The sensor unit 2 outputs a sensor signal corresponding to heat fluxes flowing outward from the ball screw 301 to the control apparatus 3. The sensor unit 2 is attached to a surface of the nut 312. Details of a structure of the sensor unit 2 will be described below.

The sensor unit 2 is connected to an input side of the control apparatus 3. The control apparatus 3 diagnoses an operating status of the ball screw 301. In this diagnosis, whether or not the operating status of the ball screw 301 indicates that the ball screw 301 is in a warming-up complete state is determined based on a detection result from the sensor unit 2. Therefore, the control apparatus 3 constitutes a control unit which determines, based on the detection result from the heat flux sensor 10, whether or not the operating status of a facility indicates that a component of the facility is in the warming-up complete state, where the warming-up of the component is completed.

The motor 303, which serves as driving equipment for the workpiece feeding apparatus 300, and the robot M2 are connected to an output side of the control apparatus 3. The control apparatus 3 controls operation of the workpiece feeding apparatus 300 based on the diagnosis result. The control apparatus 3 is configured to have a microcomputer and a storage apparatus.

Now, the structure of the sensor unit 2 will be described. As illustrated in FIG. 4, the sensor unit 2 includes two heat flux sensors 10, a thermal buffer 11, and a heat sink 12. The two heat flux sensors 10, the thermal buffer 11, and the heat sink 12 are all shaped like flat plates.

The two heat flux sensors 10 have the same internal structure. One of the two heat flux sensors 10 is a first heat flux sensor 10a. Another one of the two heat flux sensors 10 is a second heat flux sensor 10b.

The first heat flux sensor 10a is arranged in contact with an outer surface of the nut 312. The second heat flux sensor 10b is arranged on a side far from the nut 312 with respect to the first heat flux sensor 10a. The thermal buffer 11 is arranged between the first heat flux sensor 10a and the second heat flux sensor 10b. The heat sink 12 is arranged on the side far from the nut 312 with respect to the second heat flux sensor 10b. That is, in the sensor unit 2, the first heat flux sensor 10a, the thermal buffer 11, the second heat flux sensor 10b, and the heat sink 12 are arranged in this order from the side close to the nut 312 toward the side far from the nut 312.

The first heat flux sensor 10a outputs a first sensor signal corresponding to a heat flux passing through the first heat flux sensor 10a from the nut 312 side thereof toward the thermal buffer 11 side thereof. The second heat flux sensor 10b outputs a second sensor signal corresponding to a heat flux passing through the second heat flux sensor 10b from the thermal buffer 11 side thereof toward the side opposite to the thermal buffer 11 side. The first heat flux sensor 10a and the second heat flux sensor 10b appears, in plan view, as rectangles which are the same in shape and size.

The thermal buffer 11 has a predetermined heat capacity. The thermal buffer 11 is formed of a metal material or a resin material. The thermal buffer 11 has a material and a thickness set to provide a heat capacity which allows detection of changes in heat fluxes dissipated outward from the nut 312 as described below. The thermal buffer 11 has a planar shape that is the same as the planar shape of the first heat flux sensor 10a in form and size. The thermal buffer 11 may have a planar shape that is different from the planar shape of the first heat flux sensor 10a in form and size.

The heat sink 12 has a predetermined heat capacity. The heat sink 12 is formed of a metal material or a resin material. The heat sink 12 has a material and a thickness set to provide a larger heat capacity than the thermal buffer 11. The heat sink 12 is configured to have a larger planar shape than the first heat flux sensor 10a, the thermal buffer 11, and the second heat flux sensor 10b. The heat sink 12 is fixed to the nut 312 with the first heat flux sensor 10a, the thermal buffer 11, and the second heat flux sensor 10b all sandwiched between the heat sink 12 and the nut 312. Specifically, threaded holes are formed in an outer circumferential portion of the heat sink 12. The heat sink 12 is fixed to the nut 312 by screws 13 inserted into the threaded holes. Spacers 14 are arranged between the nut 312 and the heat sink 12. The screws 13 penetrate the respective spacers 14.

As illustrated in FIG. 5 and FIG. 6, each of the heat flux sensors 10 includes an insulating substrate 100, a front surface protecting member 110, and a back surface protecting member 120, which are integrated together, and first and second thermoelectric members 130, 140 are alternately and serially connected together inside the integrated components 100, 110, and 120. In FIG. 5, the surface protecting member 110 is omitted. The insulating material 100, the front surface protecting member 110, and the back surface protecting member 120 are formed like films and constituted of a flexible resin material such as a thermoplastic resin. The insulating substrate 100 has a plurality of first via holes 101 and a plurality of second via holes 102 formed therein in such a manner as to penetrate the insulating substrate 100 in a thickness direction thereof. First thermoelectric members 130 and second thermoelectric members 140, formed of different thermoelectric materials such as metals or semiconductors, are embedded in the first and second via holes 101, 102, respectively. A front surface conductor pattern 111, arranged on a front surface 100a of the insulating substrate 100, constitutes a one-side connection portion between each of the first thermoelectric members 130 and the corresponding second thermoelectric member 140. A back surface conductor pattern 121, arranged on a back surface 100b of the insulating substrate 100, constitutes an other-side connection portion between each of the first thermoelectric members 130 and the corresponding second thermoelectric member 140.

When heat fluxes pass through the heat flux sensor 10 in a thickness direction thereof, a temperature difference occurs between the set of the one-side connection portions and the set of the other-side connection portions of the first and second thermoelectric members 130, 140. Consequently, a thermoelectromotive force is generated in the first and second thermoelectric members 130, 140 due to the Seebeck effect. The heat flux sensor 10 outputs the thermoelectromotive force, specifically, a voltage, as a sensor signal.

In the present embodiment, the first heat flux sensor 10a and the second heat flux sensor 10b are configured to output sensor signals with the same absolute value when heat fluxes passing through the respective heat flux sensors are of the same magnitude.

Furthermore, as illustrated in FIG. 4, the first heat flux sensor 10a and the second heat flux sensor 10b, connected together in series, are electrically connected to the control apparatus 3. The first heat flux sensor 10a and the second heat flux sensor 10b are arranged such that, when heat fluxes from the nut 312 pass through the first heat flux sensor 10a and the second heat flux sensor 10b in this order, the heat flux sensors 10a and 10b output a first sensor signal and a second sensor signal, respectively, which have an opposite polarity relation.

Specifically, the first and second heat flux sensors 10a, 10b are arranged such that the front surface protecting members 110 thereof lie opposite to each other. Although not illustrated in the drawings, the front surface conductor patterns 111 of the first and second heat flux sensors 10a, 10b are connected together via external wiring 151. The back surface conductor patterns 121 of the first and second heat flux sensors 10a, 10b are connected to the control apparatus 3 via external wiring 152. Consequently, if a heat flux passes through the first heat flux sensor 10a from the back surface protecting member 120 side toward the front surface protecting member 110 side, then the heat flux passes through the second heat flux sensor 10b from the front surface protecting member 110 side toward the back surface protecting member 120 side, thus resulting in opposite polarities of the first and second sensor signals outputted from the first and second heat flux sensors 10a, 10b.

In the present embodiment, each of the first and second heat flux sensors 10b, 10b outputs a positive sensor signal when a heat flux passes from the back surface protecting member 120 side toward the front surface protecting member 110 side.

Thus, when heat fluxes flow from the nut 312 side toward the heat sink 12 side, the first heat flux sensor 10a outputs a positive sensor signal, whereas the second heat flux sensor 10b outputs a negative sensor signal.

The sensor unit 2 outputs a sensor signal that is a combination of the first sensor signal and the second sensor signal to the control apparatus 3. At this time, when a significant difference is present between the heat fluxes passing through the first and second heat flux sensors 10a, 10b, respectively, a larger sensor signal is output from the sensor unit 2. This corresponds to, for example, a case where the amount of heat fluxes dissipated from a target has increased rapidly. On the other hand, when only an insignificant difference is present between the heat fluxes passing through the first and second heat flux sensors 10a, 10b, respectively, a smaller output is provided by the sensor unit 2. This corresponds to, for example, a case where the amount of heat fluxes dissipated from the target has decreased or a predetermined amount of time has elapsed with a constant amount of heat fluxes dissipated from the target.

Now, the operation control of the workpiece feeding apparatus 300 and the diagnosis of operating status of the ball screw 301, which are performed by the control apparatus 3, will be described.

First, the operation control of the workpiece feeding apparatus 300 will be described. The control apparatus 3 performs a warming-up operation when the operation of the workpiece feeding apparatus 300 is started. The warming-up operation is intended to raise the temperature of the ball screw 301 from immediately after the start of the operation of the workpiece feeding apparatus 300. In the warming-up operation, the linear movement mechanism M1 is operated with no workpiece W1 mounted thereon. In the warming-up operation, the motor 303 of the linear movement mechanism M1 is driven with the robot M2 being not driven.

The control apparatus 3 performs a steady-state operation after the warming-up of the ball screw 301 is completed. The steady-state operation is an operation performed with the ball screw 301 stabilized. In the steady-state operation, the workpiece W1, mounted on the pedestal 304, is transferred. In the steady-state operation, the motor 303 for the robot M2 and the linear movement mechanism M1 is driven.

The reason why the warming-up operation is performed is as described below. During a certain period from immediately after the start of operation of the workpiece feeding apparatus 300, frictional heat generated by the balls 312 inside the nut 312 is not dissipated but is accumulated in the nut 312. Consequently, the temperature of the ball screw 301 rises. The rise in the temperature of the ball screw 301 causes the ball screw 301 to be thermally expanded. When the linear movement mechanism M1 is driven with the ball screw 301 continuously thermally expanded, the pedestal 304 is stopped at a less accurate stop position. As a result, the workpiece W1 is inappropriately transferred. Moreover, the workpiece W1 is inappropriately machined.

More specifically, the moving distance of the nut 312 depends on the rotation speed of the screw shaft 311. For transfer of the workpiece W1, the rotation speed of the screw shaft 311 is set to allow the pedestal 304 to stop at a predetermined position. However, when the screw shaft 311 or the nut 312 is thermally expanded in the axial direction, the moving distance of the nut 312 varies even with the rotation speed of the screw shaft 311 remaining the same. Thus, the stop position of the pedestal 304 varies. If the workpiece W1 is machined at a position to which the workpiece W1 has been transferred, the workpiece W1 is precluded from being machined when the stop position is different from the predetermined position.

Thus, the warming-up operation is performed until the ball screw 301 is stabilized. Once the warming-up is completed, the operation is switched to the steady-state operation. Consequently, the workpiece W1 is restrained from being inappropriately transferred.

Next, heat fluxes passing through the sensor unit 2 and the sensor signal output from the sensor unit 2 will be described.

The linear movement mechanism M1 repeats operation cycles each including operation and stoppage of the ball screw 301. During operation of the ball screw 301, the frictional heat generated by the balls 313 is dissipated from the nut 312, thus increasing an output value of the sensor unit 2. During stoppage of the ball screw 301, no frictional heat is generated, thus reducing the output value of the sensor unit 2. Consequently, the output value of the sensor unit 2 is increased or reduced depending on the operation cycle both during a warming-up state where the ball screw 301 is being warmed up and during a warming-up complete state where the warming-up is completed.

Immediately after the start of operation of the linear movement mechanism M1, when the nut 312 has a low temperature, the frictional heat is accumulated in the nut 312. The temperature inside the nut 312 rises earlier than the temperature outside the nut 312. Thus, in this state, a smaller amount of heat is dissipated outward from the nut 312 than in the warming-up complete state. When heat is accumulated throughout the nut 312 to raise the temperature thereof, an increased amount of heat is dissipated outward from the nut 312. Thus, in the warming-up state, the sensor unit 2 has a waveform rising over time as illustrated in FIG. 7.

On the other hand, when the ball screw 301 is in the warming-up complete state, the heat accumulation in the nut 312 has ended. The amount of heat resulting from the friction of the balls is equal to the amount of heat dissipated outward from the nut 312. Thus, during the warming-up complete state, the sensor unit 2 has an output waveform indicative of an output value which is larger than the output value during the warming-up state and which increases and decreases by an approximately constant magnitude as illustrated in FIG. 7.

Stoppage of the ball screw 301 causes the heat accumulated in the nut 312 to be dissipated. However, the ball screw 301 is operated during the heat dissipation. That is, the ball screw 301 is operated in such operation cycles as allowing a certain amount of heat to be accumulated in the nut 312. Thus, the sensor unit 2 has a larger output value in the warming-up complete state than in the warming-up state in spite of the provision of the stoppage period for the ball screw 301.

As described above, the output value from the sensor unit 2 varies between the warming-up state and the warming-up complete state. Thus, a threshold is preset which is used to determine whether or not the ball screw 301 is in the warming-up complete state, to allow the output value of the sensor unit 2 to be compared with the threshold. This enables determination of whether or not the ball screw 301 is in the warming-up complete state.

Thus, in switching control for switching from the warming-up operation to the steady-state operation of the workpiece feeding apparatus 300, the control apparatus 3 diagnoses the operating status of the ball screw 301 based on a detection result from the sensor unit 2 as illustrated in FIG. 8. The switching control is performed when the warming-up operation of the workpiece feeding apparatus 300 is started. Steps illustrated in FIG. 8 constitute a function implementing unit that implements various functions.

Specifically, the control apparatus 3 acquires a detected value from the sensor unit 2. Here, the output value (Specifically, the voltage value) of the sensor unit 2 is acquired. Instead of using the output value of the sensor unit 2 without any change, it is also preferable to acquire a corrected value corresponding to the corrected output value, as the detected value.

Subsequently, in step S2, the control apparatus 3 compares the detected value with the threshold pre-stored in the storage apparatus to determine whether or not the detected value is larger than the threshold. At this time, in step S1, the control apparatus 3 acquires a plurality of detected values for different elapsed times from the start of the warming-up operation. In step S2, the control apparatus 3 preferably determines whether or not all of the plurality of detected values are larger than the threshold.

In step S2, if the detected value is smaller than the threshold, the control apparatus 3 makes a negative determination to end the control processing illustrated in the flowchart in FIG. 8. The control apparatus 3 then executes step S1 again.

On the other hand, if the detected value is larger than the threshold, the control apparatus 3 makes an affirmative determination to proceed to step S3. In step S3, the control apparatus 3 switches the operating status of the workpiece feeding apparatus 300 from the warming-up operation to the steady-state operation. Consequently, the workpiece W1 is transferred by the linear movement mechanism M1 and the robot M2. Then, machining of the workpiece W1 is started.

As described above, the diagnostic apparatus 1 of the present embodiment can appropriately determine whether or not the operating status of the ball screw 301 indicates that the ball screw 301 is in a warming-up complete state.

Furthermore, in the diagnostic apparatus 1 of the present embodiment, the sensor unit 2 includes the thermal buffer 11 between the first heat flux sensor 10a and the second heat flux sensor 10b. The control apparatus 3 determines whether or not the ball screw 301 is in the warming-up complete state based on the first sensor signal output by the first heat flux sensor 10a and the second sensor signal output by the second heat flux sensor 10b.

The thermal buffer 11 accumulates and dissipates heat. Thus, when the heat fluxes dissipated from the nut 312 change, the heat flux passing through the second heat flux sensor 10b changes later and more slowly than the heat flux passing through the first heat flux sensor 10a does. Therefore, a difference between the first sensor signal and the second sensor signal allows a change in the heat fluxes dissipated from the nut 312 to be detected.

Alternatively, instead of the sensor unit 2 of the present embodiment, the single heat flux sensor 10 may exclusively be used to detect the heat fluxes dissipated from the nut 312.

However, in this case, when the environmental temperature around the workpiece feeding apparatus 300 changes, the heat fluxes passing through the heat flux sensor 10 also changes under the effect of the environmental temperature. Specifically, even with the same amount of heat generated inside the nut 312, the heat fluxes passing through the heat flux sensor 10 have a larger magnitude when the environmental temperature is low than when the environmental temperature is high. Even with the same amount of heat generated inside the nut 312, the heat fluxes passing through the heat flux sensor 10 have a smaller magnitude when the environmental temperature is high than when the environmental temperature is low.

Thus, as illustrated by a solid line in FIG. 9, when the environmental temperature is lower than that illustrated by a wavy line in FIG. 9, the output value of the sensor unit 2 may exceed the threshold even if the ball screw 301 is in the warming-up state. In this case, the control apparatus 3 erroneously determines that the ball screw 301 is in the warming-up complete state though the ball screw 301 is actually in the warming-up state. Furthermore, as illustrated by an alternate long and short dash line in FIG. 9, when the environmental temperature is higher than that illustrated by a dashed line in FIG. 9, the output value of the sensor unit 2 may not exceed the threshold even if the ball screw 301 is in the warming-up complete state. In this case, the control apparatus 3 erroneously determines that the ball screw 301 is in the warming-up state though the ball screw 301 is actually in the warming-up complete state.

In contrast, the first heat flux sensor 10a and the second heat flux sensor 10b of the sensor unit 2 of the present embodiment are arranged on the opposite sides of the thermal buffer 11. Therefore, the first heat flux sensor 10a and the second heat flux sensor 10b are arranged relatively close to each other. Furthermore, the environmental temperature around the sensor unit 2 typically varies slowly over a long period of one day. Thus, even though the thermal buffer 11 is arranged between the first heat flux sensor 10a and the second heat flux sensor 10b, the first heat flux sensor 10a and the second heat flux sensor 10b are subjected to the same or substantially the same effect of the environmental temperature. Each of the first heat flux sensor 10a and the second heat flux sensor 10b outputs a sensor signal corresponding to the heat flux subjected to the same effect of the environmental temperature. Outputs from the first heat flux sensor 10a and the second heat flux sensor 10b have the same absolute value for the same magnitude of the heat flux. Therefore, the use of the sum of the outputs from the first heat flux sensor 10a and the second heat flux sensor 10b allows elimination (that is, cancellation) of the effect of the environmental temperature on the detection result from the sensor unit 2.

Thus, the output waveform of the sensor unit 2 in the warming-up complete state is free from the effect of the environmental temperature as illustrated in FIG. 7. This allows avoidance of erroneous determination caused by a variation in the environmental temperature during a single day.

Therefore, the diagnostic apparatus 1 of the present embodiment can accurately diagnose the warming-up complete status. The outputs from the first heat flux sensor 10a and the second heat flux sensor 10b do not necessarily have the same absolute value for the same magnitude of the heat flux. The outputs may have any absolute values as long as the absolute values are close to each other. Even in this case, the use of the sum of the outputs from the first heat flux sensor 10a and the second heat flux sensor 10b enables a reduction in the effect of the environmental temperature on the detection result from the sensor unit 2.

Furthermore, in the sensor unit 2 of the present embodiment, the first heat flux sensor 10a and the second heat flux sensor 10b output the first sensor signal and the second sensor signal, respectively, which have an opposite polarity relation, when a heat flux from the nut 312 passes through the first heat flux sensor 10a and the second heat flux sensor 10b in this order. The first heat flux sensor 10a and the second heat flux sensor 10b, connected together in series, are electrically connected to the control apparatus 3. Consequently, a sensor signal corresponding to a combination of the first sensor signal and the second sensor signal can be outputted from the sensor unit 2 toward the control apparatus 3. This allows omission of the calculation of the sum of the first sensor signal and the second sensor signal performed by the control apparatus 3. That is, the calculation processing executed by the control apparatus 3 can be simplified.

The sensor unit 2 may be configured not to have the heat sink 12. However, if the sensor unit 2 does not have the heat sink 12, a front surface temperature of the second heat flux sensor 10b instantaneously changes, for example, because the front surface of the second heat flux sensor 10b is exposed to atmosphere. This affects the heat fluxes passing through the sensor unit 2. Thus, the sensor unit 2 has a reduced accuracy with which the heat fluxes are detected.

In contrast, the sensor unit 2 of the present embodiment includes the heat sink 12 having a predetermined heat capacity. Consequently, even if the front surface temperature of the sensor unit 2 varies in a short period of time, a possible variation in the temperature of the second heat flux sensor 10b can be suppressed from occurring by accumulation and dissipation of heat in and from the heat sink 12. Thus, the accuracy with which the sensor unit 2 detects the heat fluxes can be increased.

Furthermore, in the sensor unit 2 of the present embodiment, the heat sink 12 is configured to have a larger heat capacity than the thermal buffer 11. Consequently, even when a large amount of heat is dissipated from the nut 312, the heat can be directed from the nut 312 toward the heat sink 12. Thus, heat can be prevented from being trapped inside the sensor unit 2.

Second Embodiment

As illustrated in FIG. 10, an operating-status diagnostic apparatus 1 according to the present embodiment diagnoses a warming-up complete status of an automatic cutting machine 400.

The automatic cutting machine 400 includes a drill 401, a chuck unit 402 for the drill, and a chuck unit for a workpiece. The drill 401 is a cutting tool used for cutting. The chuck unit 402 for the drill is a holding unit which holds the drill 401. The chuck unit 403 for the workpiece is a holding unit which holds a workpiece W2, corresponding to a machining object. The automatic cutting machine 400 repeats machining and stoppage to machine a plurality of workpieces W2 one by one in this order. During machining, friction between the drill 401 and the workpiece W2 causes the drill 401 to generate heat. The heat generated by the drill 401 is dissipated outward from the chuck unit 402 of the drill.

The diagnostic apparatus 1 includes the sensor unit 2 and the control apparatus 3.

The sensor unit 2 is attached to a front surface of the chuck unit 402 for the drill. The sensor unit 2 detects heat fluxes flowing outward from the drill 401 via the chuck unit 402 for the drill. The sensor unit 2 outputs a sensor signal corresponding to heat fluxes flowing outward from the drill 401 via the chuck unit 402 for the drill to the control apparatus 3. A configuration of the sensor unit 2 is the same as the configuration of the sensor unit 2 of the first embodiment.

The control apparatus 3 performs operation control for the automatic cutting machine 400 and diagnosis of the operating status of the drill 401. In the operation control for the automatic cutting machine 400, the control apparatus 3 performs a warming-up operation on the drill 401 when operation of the automatic cutting machine 400 is started. The warming-up operation is an operation for machining a workpiece for warming-up instead of the workpiece W2, intended for machining. The control apparatus 3 performs a steady-state operation after the warming-up operation for the drill 401. The steady-state operation is an operation for machining the workpiece W2, intended for machining.

During a certain period from immediately after the start of operation of the automatic cutting machine 400, the drill 401 generates heat to raise the temperature of the drill 401. The rise in the temperature of the drill 401 causes the drill 401 to be thermally expanded. When the workpiece W2 is machined with the drill 401 continuously thermally expanding, machining accuracy decreases. Thus, the warming-up operation is performed until the drill 401 is stabilized. Once the warming-up is completed, the control apparatus 3 switches from the warming-up operation to the steady-state operation.

To switch from the warming-up operation to the steady-state operation, the control apparatus 3 diagnoses the operating status of the drill 401. Specifically, the control apparatus 3 determines whether or not the operating status of the drill 401 indicates that the drill 401 is in a warming-up complete state based on a detection result from the sensor unit 2.

Output waveforms obtained when the drill 401 is in the warming-up state and when the drill 401 is in the warming-up complete state are similar to the waveforms described in the first embodiment and illustrated in FIG. 7. Thus, also in the present embodiment, a threshold used to determine whether or not the drill 401 is in the warming-up complete state is pre-stored in the control apparatus 3. Then, the control apparatus 3 compares an output value of the sensor unit 2 with the threshold. Consequently, the control apparatus 3 can determine whether or not the drill 401 is in the warming-up complete state.

Furthermore, the sensor unit 2 used for the diagnostic apparatus 1 has the same configuration as the sensor unit 2 of the first embodiment. Thus, the diagnostic apparatus 1 of the present embodiment produces effects similar to those of the diagnostic apparatus 1 of the first embodiment.

The first heat flux sensor 10 may exclusively be used as the sensor unit 2 used for the diagnostic apparatus 1.

Third Embodiment

The present embodiment corresponds to the first embodiment with the configuration of the sensor unit 2 being changed. The remaining part of the configuration of a diagnostic apparatus 1 of the present embodiment is the same as the corresponding part in the first embodiment.

As illustrated in FIG. 11, a sensor unit 2 of the present embodiment has a flat-plate-like heat receiver 16. The heat receiver 16 is arranged closer to a nut 312 than a first heat flux sensor 10a is. Therefore, the heat receiver 16 is arranged between the nut 312 and the first heat flux sensor 10a.

Like the thermal buffer 11 and the heat sink 12, the heat receiver 16 has a predetermined heat capacity. The heat receiver 16 is formed of a metal material or a resin material. The heat receiver 16 has a material and a thickness set to provide a smaller heat capacity than the thermal buffer 11 and the heat sink 12. The heat receiver 16 has a planar shape which is the same as the planar shape of the first heat flux sensor 10a in form and size. The planar shape of the heat receiver 16 may be different from the planar shape of the first heat flux sensor 10a in form and size.

In the sensor unit 2 of the present embodiment, a possible short-time change in heat fluxes such as noise which is not intended to be detected can be restrained from affecting the first and second heat flux sensors 10a, 10b, based on accumulation and dissipation of heat in and from the heat receiver 16.

Furthermore, in the sensor unit 2 of the present embodiment, a small heat capacity is set for the heat receiver 16. Thus, the sensor unit 2 of the present embodiment can detect changes in heat fluxes resulting from operation and stoppage of the ball screw 301 of which changes are intended to be detected. That is, in the sensor unit 2 of the present embodiment, the heat capacity of the heat receiver 16 is set to a magnitude at which the sensor unit 2 can detect changes in heat fluxes resulting from operation and stoppage of the ball screw 301.

Therefore, the diagnostic apparatus 1 of the present embodiment can accurately determine whether or not the ball screw 301 is in the warming-up complete state. Also in the second embodiment, the sensor unit 2 may be configured to have the heat receiver 16. Then, the second embodiment produces effects similar to those of the present embodiment.

Fourth Embodiment

The present embodiment corresponds to the first embodiment with the configuration of the sensor unit 2 being changed. The remaining part of the configuration of a diagnostic apparatus 1 of the present embodiment is the same as the corresponding part in the first embodiment.

As illustrated in FIG. 12, in the sensor unit 2 of the present embodiment, the first and second heat flux sensors 10a, 10b are connected together via a bent shape portion 10c having a bent shape. Like the first and second heat flux sensor 10a, 10b, the bent shape portion 10c is structured such that the insulating substrate 100, the front surface protecting member 110, and the back surface protecting member 120 are laid on top of one another. Consequently, in the sensor unit 2 of the present embodiment, the first and second heat flux sensors 10a, 10b are integrated together.

In other words, the sensor unit 2 of the present embodiment is structured such that the single heat flux sensor 10 is bent in such a manner as to enclose the thermal buffer 11. In the heat flux sensor 10, each of the insulating substrate 100, the front surface protecting member 110, and the back surface protecting member 120 is formed of a flexible resin material as described above. Thus, the heat flux sensor 10 can be easily bent. This results in implementation of the configuration where the thermal buffer 11 is arranged between the first heat flux sensor 10a and the second heat flux sensor 10b.

For the first and second heat flux sensors 10a, 10b, the back surface conductor patterns 121 thereof are connected together. The first and second heat flux sensors 10a, 10b are electrically connected together using a wiring pattern inside the heat flux sensor 10 instead of the external wiring 151. Alternatively, for the first and second heat flux sensors 10a, 10b, the front surface conductor patterns thereof may be connected together.

Consequently, the first and second heat flux sensors 10a, 10b are configured as the single heat flux sensor 10, allowing omission of the external wiring 151 used for connecting the first heat flux sensor 10a and the second heat flux sensor 10b. Therefore, the number of components to be needed can be reduced.

Other Embodiments

The present disclosure is not limited to the above-described embodiments, and appropriate modifications may be made to the embodiments within the scope recited in the claims.

(1) The diagnostic apparatus 1 of the first embodiment has the workpiece feeding apparatus 300 as a diagnosis target. The diagnostic apparatus 1 of the second embodiment has the automatic cutting machine 400 as a diagnosis target. The diagnosis target of the diagnostic apparatus 1 is not limited to these apparatuses. The diagnostic apparatus 1 may have, as a diagnosis target, another facility in which a warming-up operation is performed.

(2) In the first embodiment, to determine whether or not the diagnosis target is in the warming-up complete state, the control apparatus 3 determines in step S2 whether or not the absolute value of the detected value is larger than the threshold. However, the control apparatus 3 may make another determination. As described in the first embodiment, the sensor unit 2 provides an output waveform exhibiting an increase or a decrease by an approximately constant magnitude in the warming-up complete state. Thus, the control apparatus 3 may calculate a range of fluctuation corresponding to a difference between the minimum value and the maximum value of the detected value during a predetermined period and determine whether or not the calculated range of fluctuation is smaller than a predetermined range.

(3) In the first embodiment, the single control apparatus 3 performs diagnosis of the warming-up complete status as a part of the switching control for switching from the warming-up operation to the steady-state operation. However, one of two separate control apparatuses may perform the switching control, and the other control apparatus may perform the diagnosis. In this case, the control apparatus performing the diagnosis constitutes the control unit of the operating-status diagnostic apparatus.

(4) In the first embodiment, the control apparatus 3 switches from the warming-up operation to the steady state in step S3, in a case of determining that the diagnosis target is in the warming-up complete state because the detected value has exceeded the threshold. In contrast, if the warming-up operation is manually switched to the steady state, the warming-up complete may be displayed on a display apparatus in step S3.

(5) In the sensor unit 2 in the first to third embodiments, the first heat flux sensor 10a and the second heat flux sensor 10b, connected together in series, are electrically connected to the control apparatus 3. However, the first heat flux sensor 10a and the second heat flux sensor 10b may be connected in parallel with the control apparatus 3.

(6) In the sensor unit 2 in the first to third embodiments, the first heat flux sensor 10a and the second heat flux sensor 10b are arranged so as to output the first sensor signal and the second sensor signal having the opposite polarity relation. However, the arrangement of the first heat flux sensor 10a and the second heat flux sensor 10b is not limited thereto. The first heat flux sensor 10a and the second heat flux sensor 10b may be arranged so as to output the first sensor signal and the second sensor signal having the same polarity. In this case, the first heat flux sensor 10a and the second heat flux sensor 10b are connected in parallel with the control apparatus 3. Furthermore, in the diagnosis of the operating status, the control apparatus 3 calculates the difference between the first sensor signal and the second sensor signal. Consequently, the diagnosis can be performed as is the case with the first and second embodiments.

(7) In the sensor unit 2 in the first to third embodiments, the insulating substrate 100, the front surface protecting member 110, and the back surface protecting member 120 of the heat flux sensor 10 may be formed of a flexible insulating material other than the resin material. Moreover, the insulating substrate 100, the front surface protecting member 110, and the back surface protecting member 120 may be formed of an inflexible insulating material. Alternatively, the heat flux sensor 10 may be structured not to have the front surface protecting member 110 or the back surface protecting member 120. Furthermore, the heat flux sensor 10 may have a configuration different from the above-described one.

(8) In the sensor unit 2 of the fourth embodiment, the insulating substrate 100, the front surface protecting member 110, and the back surface protecting member 120 of the heat flux sensor 10 may be formed of a flexible insulating material other than the resin material. Alternatively, the heat flux sensor 10 may be structured not to have the front surface protecting member 110 or the back surface protecting member 120. In this case, the first heat flux sensor 10a and the second heat flux sensor 10b are connected together via the bent shape portion 10c constituted of the insulating substrate 100. In short, the bent shape portion 10c may be configured to contain the same insulating material as that of the insulating substrate 100.

(9) The sensor unit 2 of each of the above-described embodiments includes the two heat flux sensors 10, the thermal buffer 11, and the heat sink 12. However, the heat sink 12 may be omitted. In this case, the sensor unit 2 is fixed using another fixing member or an adhesive.

(10) In each of the above-described embodiments, the voltage is used as the sensor signal from the sensor unit 2. However, an electric current may be used as the sensor signal from the sensor unit 2.

(11) The above-described embodiments are not irrelevant to one another but may be appropriately combined together unless the combination is obviously impossible.

Furthermore, the elements constituting each of the above-described embodiments are of course not necessarily essential unless otherwise specified and unless the elements are obviously essential in principle.

SUMMARY

According to a first aspect disclosed by a part or all of each of the above-described embodiments, an operating-status diagnostic apparatus includes a sensor unit and a control unit. The sensor unit detects heat fluxes flowing outward from a component of a facility. The control unit determines whether or not an operating status of the facility indicates that the component is in a warming-up complete state where warming-up of the component is completed.

According to a second aspect, the sensor unit has a first heat flux sensor, a second heat flux sensor, and a thermal buffer arranged between the first heat flux sensor and the second heat flux sensor. The first heat flux sensor outputs a first sensor signal corresponding to a heat flux passing through the first heat flux sensor. The second heat flux sensor outputs a second sensor signal corresponding to a heat flux passing through the second heat flux sensor. The control unit determines whether or not the component is in the warming-up complete state based on the first sensor signal and the second sensor signal.

In the second aspect, the thermal buffer is arranged between the first heat flux sensor and the second heat flux sensor in the sensor unit. Thus, when the heat fluxes dissipated from the component change, the heat flux passing through the second heat flux sensor changes later and more slowly than the heat flux passing through the first heat flux sensor does. Therefore, the change in the heat fluxes dissipated from the component can be detected based on the difference between the first sensor signal and the second sensor signal.

The first heat flux sensor and the second heat flux sensor are arranged on the opposite sides of the thermal buffer and relatively close to each other. The environmental temperature, which is the temperature of an environment where the sensor unit is installed, typically varies slowly over a long period of time. Thus, the first heat flux sensor and the second heat flux sensor are subjected to the same or substantially the same effect of the environmental temperature. Each of the first heat flux sensor and the second heat flux sensor outputs a sensor signal corresponding to the heat flux subjected to the same or substantially the same effect of the environmental temperature. Therefore, the use of the sensor signals from both heat flux sensors enables elimination or reduction of the effect of the environmental temperature on the detection result from the sensor unit. Therefore, the diagnostic apparatus of the second aspect can accurately diagnose the warming-up complete status.

Furthermore, according to a third aspect, the sensor unit has a heat sink arranged farther from the component than the second heat flux sensor is and having a predetermined heat capacity.

Consequently, even if the surface temperature of the sensor unit varies in a short period of time, a possible variation in the temperature of the second heat flux sensor can be suppressed from occurring. Thus, the accuracy of the heat fluxes which the sensor unit detects can be improved.

Furthermore, according to a fourth aspect, the heat sink is configured to have a larger heat capacity than the thermal buffer. Consequently, even when the component dissipates a large amount of heat, the heat can be passed from the component toward the heat sink. Thus, the heat can be prevented from being trapped inside the sensor unit.

Furthermore, according to a fifth aspect, the sensor unit has a heat receiver arranged closer to the component than the first heat flux sensor is. The heat receiver is configured to have a smaller heat capacity than the thermal buffer.

Consequently, a possible short-time change in heat fluxes such as noise which is not intended to be detected can be restrained from affecting the first and second heat flux sensors based on accumulation and dissipation of heat in and from the heat receiver. Furthermore, setting a reduced heat capacity for the heat receiver allows the sensor unit to detect a change in heat fluxes dissipated from the component which change is intended to be detected.

Furthermore, according to a sixth aspect, in the sensor unit, the first heat flux sensor and second heat flux sensor are arranged such that the first sensor signal and the second sensor signal have opposite polarities when heat fluxes from the component pass through the first heat flux sensor and the second heat flux sensor in this order. The first heat flux sensor and the second heat flux sensor are electrically connected together in series.

Consequently, the sensor unit can output a sensor signal corresponding to a combination of the first sensor signal and the second sensor signal. This enables elimination of the need for a calculation process for the sum of the first sensor signal and the second sensor signal.

Furthermore, according to a seventh aspect, each of the first heat flux sensor and the second heat flux sensor is configured to have a flexible film-like insulating substrate, a plurality of first thermoelectric members, and a plurality of second thermoelectric members. The plurality of first thermoelectric members and the plurality of second thermoelectric members are alternately connected together in series. The first heat flux sensor and the second heat flux sensor are connected together via a bent shape portion configured to contain an insulating material.

This eliminates the need for external wiring for connection between the first heat flux sensor and the second heat flux sensor.

What is claimed is:

1. An operating-status diagnostic apparatus diagnosing an operating status of a facility, the apparatus comprising:
a sensor unit for detecting heat fluxes flowing outward from a component of the facility; and
a control unit for determining whether or not the operating status of the facility indicates that the component is in a warming-up complete state where warming-up of the component is completed based on a detection result of detection by the sensor unit, wherein
the sensor unit has:
a first heat flux sensor;
a second heat flux sensor arranged farther from the component than the first heat flux sensor is; and
a thermal buffer arranged between the first heat flux sensor and the second heat flux sensor and having a predetermined heat capacity, wherein
the first heat flux sensor outputs a first sensor signal corresponding to a heat flux passing through the first heat flux sensor from the component side toward the thermal buffer,
the second heat flux sensor outputs a second sensor signal corresponding to a heat flux passing through the second heat flux sensor from the thermal buffer side toward a side opposite to the thermal buffer side, and
the control unit determines whether or not the component is in the warming-up complete state based on the first sensor signal and the second sensor signal.

2. The operating-status diagnostic apparatus according to claim 1, wherein
the sensor unit has a heat sink arranged farther from the component than the second heat flux sensor is and has a predetermined heat capacity.

3. The operating-status diagnostic apparatus according to claim 2, wherein
the heat sink is configured to have a larger heat capacity than the thermal buffer.

4. The operating-status diagnostic apparatus according to claim 1, wherein
the sensor unit has a heat receiver arranged closer to the component than the first heat flux sensor is, and
the heat receiver is configured to have a smaller heat capacity than the thermal buffer.

5. The operating-status diagnostic apparatus according to claim 1, wherein
the first heat flux sensor and the second heat flux sensor are arranged such that, when a heat flux from the component passes through the first heat flux sensor and the second heat flux sensor in this order, the first sensor signal and the second sensor signal have opposite polarities, and
the first heat flux sensor and the second heat flux sensor are electrically connected together in series.

6. The operating-status diagnostic apparatus according to claim 5, wherein
each of the first heat flux sensor and the second heat flux sensor has:
an insulating substrate formed at least of an insulating material and having flexibility,
a plurality of first thermoelectric members formed in the insulating substrate and formed of a thermoelectric material, and
a plurality of second thermoelectric members formed in the insulating substrate and formed of a thermoelectric material different from the thermoelectric material of the first thermoelectric members,
the plurality of first thermoelectric members and the plurality of second thermoelectric members are alternately connected together in series, and
the first heat flux sensor and the second heat flux sensor are connected together via a bent shape portion configured to include the insulating material.

* * * * *